(12) United States Patent
Kawaguchi

(10) Patent No.: US 9,321,311 B2
(45) Date of Patent: Apr. 26, 2016

(54) WHEEL SUPPORT DEVICE

(71) Applicant: JTEKT CORPORATION, Osaka-shi, Osaka (JP)

(72) Inventor: Kouji Kawaguchi, Izumi (JP)

(73) Assignee: JTEKT CORPORATION, Osaka (JP)

( * ) Notice: Subject to any disclaimer, the term of this patent is extended or adjusted under 35 U.S.C. 154(b) by 465 days.

(21) Appl. No.: 13/751,817

(22) Filed: Jan. 28, 2013

(65) Prior Publication Data

US 2013/0200686 A1 Aug. 8, 2013

(30) Foreign Application Priority Data

Feb. 2, 2012 (JP) ................................ 2012-020716

(51) Int. Cl.
*B60B 27/00* (2006.01)
*B60B 35/12* (2006.01)

(52) U.S. Cl.
CPC ........... *B60B 35/128* (2013.01); *B60B 27/0026* (2013.01); *B60B 27/0042* (2013.01); *B60B 27/00* (2013.01); *B60B 27/0005* (2013.01); *B60B 27/0094* (2013.01); *B60B 2900/131* (2013.01)

(58) Field of Classification Search
CPC    B60B 27/00; B60B 27/0015; B60B 27/0021; B60B 27/0026; B60B 27/0036; B60B 27/0042
USPC .............. 301/105.1, 111.01–111.04; 384/544
See application file for complete search history.

(56) References Cited

U.S. PATENT DOCUMENTS

| 4,440,256 | A | * | 4/1984 | Palmer ........................... 180/254 |
| 5,536,098 | A | * | 7/1996 | Schwarzler ................... 403/259 |
| 6,059,378 | A | | 5/2000 | Dougherty et al. |
| 6,908,231 | B2 | * | 6/2005 | Hagiwara ...................... 384/537 |
| 7,707,724 | B2 | * | 5/2010 | Yasumura et al. ......... 29/898.07 |
| 8,353,775 | B2 | * | 1/2013 | Kamikawa et al. ................ 464/7 |
| 2005/0223557 | A1 | | 10/2005 | Yasumura et al. |
| 2008/0018170 | A1 | * | 1/2008 | Cermak ..................... 301/105.1 |

(Continued)

FOREIGN PATENT DOCUMENTS

| EP | 0 065 127 A2 | 11/1982 |
| JP | A-2008-536737 | 9/2008 |
| JP | A-2008-538343 | 10/2008 |

(Continued)

OTHER PUBLICATIONS

Jun. 17, 2013 Extended European Search Report issued in European Patent Application No. 13153083.4.

(Continued)

*Primary Examiner* — Jason Bellinger

(74) *Attorney, Agent, or Firm* — Oliff PLC

(57) ABSTRACT

In a wheel support device, a through-hole is formed so as to pass through a hub spindle in its axial direction, an outer ring shaft portion passed through the through-hole is formed in the outer ring, a first connecting portion of which the inner diameter gradually increases toward an axial outer side is formed in the inner periphery of the hub spindle, which defines the through-hole, a second connecting portion that is arranged radially inward of the first connecting portion and of which the outer diameter gradually increases toward the axial outer side is formed in the outer ring shaft portion so as to correspond to the first connecting portion, and the first connecting portion and the second connection portion have spline teeth that mesh with each other.

4 Claims, 2 Drawing Sheets

OUTER SIDE
IN VEHICLE LATERAL DIRECTION

INNER SIDE
IN VEHICLE LATERAL DIRECTION

(56) References Cited

U.S. PATENT DOCUMENTS

2008/0175526 A1    7/2008    Langer et al.
2008/0185906 A1    8/2008    Langer et al.

FOREIGN PATENT DOCUMENTS

JP    2011-168266 A    9/2011
WO    WO 2007/125654 A1    11/2007

OTHER PUBLICATIONS

Sep. 29, 2015 Office Action issued in Japanese Patent Application No. 2012-020716.

* cited by examiner

WHEEL SUPPORT DEVICE

INCORPORATION BY REFERENCE

The disclosure of Japanese Patent Application No. 2012-020716 filed on Feb. 2, 2012 including the specification, drawings and abstract, is incorporated herein by reference in its entirety.

BACKGROUND OF THE INVENTION

1. Field of the Invention

The invention relates generally to a wheel support device, and more specifically to a wheel support device in which a hub spindle of a hub wheel, to which a wheel is fitted, and an outer ring of a constant velocity joint are connected to each other such that power is transmitted therebetween.

2. Description of Related Art

There is a conventional wheel support device that includes a hub unit to which an automobile wheel is fitted, and a constant velocity joint that transmits rotative power to a hub spindle of the hub unit. A wheel support device of this type is described in Japanese Patent Application Publication No. 2008-536737 (JP 2008-536737 A), and Japanese Patent Application Publication No. 2008-538343 (JP 2008-538343 A). In the wheel support device described in each of these publications, spline teeth (side face splines) are formed on an inner end face (end face on the inner side in the vehicle lateral direction) of a hub spindle of a hub wheel and on an outer end face (end face on the outer side in the vehicle lateral direction) of an outer ring of a constant velocity joint such that the spline teeth of the hub spindle and the spline teeth of the outer ring mesh with each other, and rotative power is transmitted from the outer ring to the hub spindle via the spline teeth.

The conventional spline teeth described in JP 2008-536737 A and JP 2008-538343 A are formed in a radial fashion along the radial direction. Therefore, the shaft center of the hub spindle and the shaft center of the outer ring of the constant velocity joint may be offset from each other in the radial direction when the hub spindle and the outer ring are connected to each other. Such an offset between the shaft centers may cause vibration in a power transmission system.

SUMMARY OF THE INVENTION

It is an object of the invention to provide a wheel support device in which the shaft center of a hub spindle and the shaft center of an outer ring of a constant velocity joint are easily aligned with each other.

An aspect of the invention relates to a wheel support device, including: a hub spindle of a hub wheel to which a vehicle wheel is fitted; and an outer ring of a constant velocity joint, which is connected to the hub spindle such that power is able to be transmitted between the outer ring and the hub spindle. A through-hole that passes through the hub spindle in an axial direction of the hub spindle is formed in the hub spindle. An outer ring shaft portion that is passed through the through-hole is formed in the outer ring. A first connecting portion of which an inner diameter gradually increases toward an axial outer side is formed in an inner periphery of the hub spindle, which defines the through-hole. A second connecting portion that is arranged radially inward of the first connecting portion and of which an outer diameter gradually increases toward the axial outer side is formed in the outer ring shaft portion so as to correspond to the first connecting portion. The first connecting portion has spline teeth and the second connecting portion has spline teeth, and the spline teeth of the first connecting portion and the spline teeth of the second connecting portion mesh with each other.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
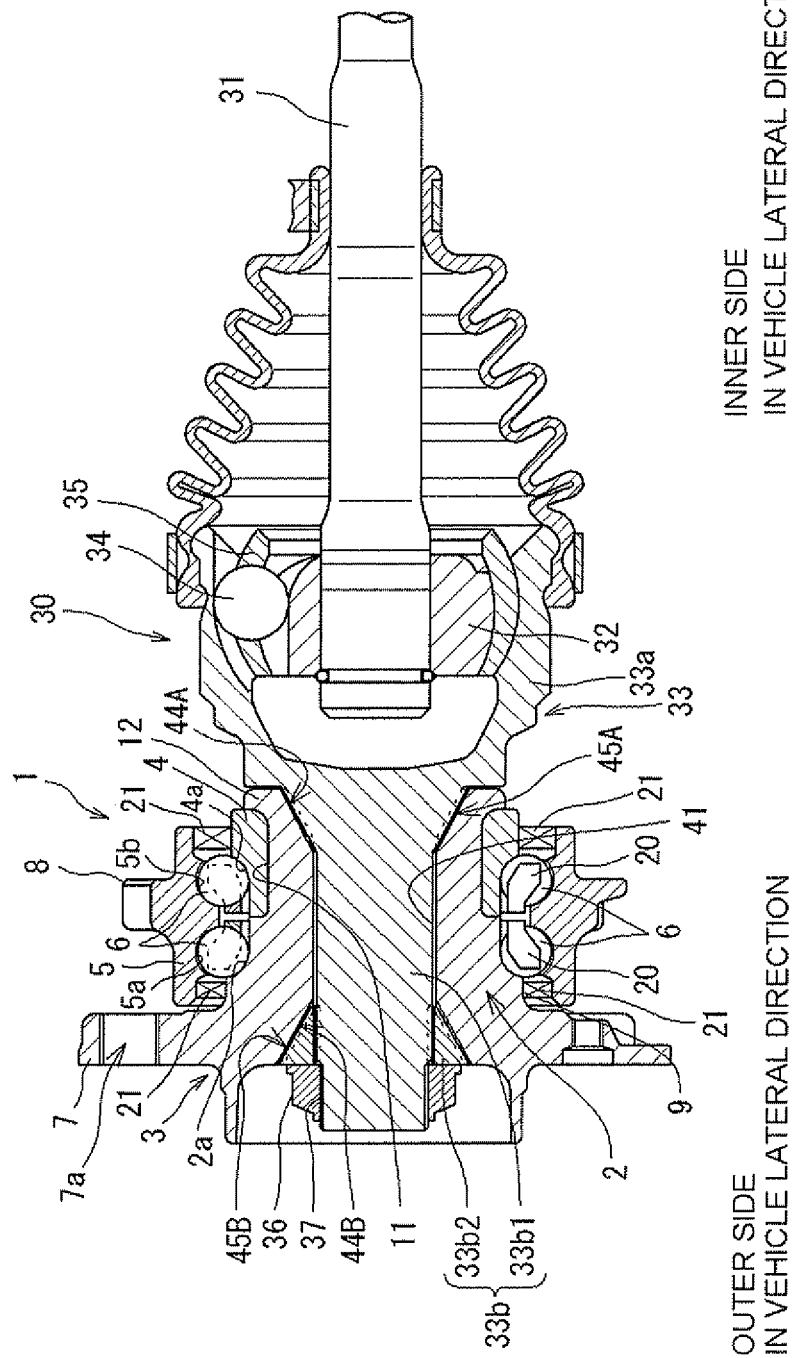
FIG. 1 is a sectional view illustrating a wheel support device according to an embodiment of the invention.

A method of manufacturing a vehicle hub unit according to an embodiment of the invention will be described in detail with reference to the accompanying drawings. FIG. 1 is a sectional view showing a wheel support device according to an embodiment of the invention. The wheel support device includes a vehicle hub unit 1 and a constant velocity joint 30. The hub unit 1 supports a wheel of an automobile such that the wheel is rotatable with respect to a suspension. The hub unit 1 includes a hub wheel 3, an inner ring component member 4, an outer ring member 5, and a plurality of rolling elements 6. The hub wheel 3 has a cylindrical hub spindle 2. The inner ring component member 4 is fixed by clinching to an inner end portion (a right end portion in FIG. 1) of the hub spindle 2 in the vehicle lateral direction. The outer ring member 5 is arranged radially outward of the hub spindle 2. The rolling elements 6 are rollably arranged between outer ring raceways 5a, 5b formed on an inner peripheral face of the outer ring member 5, and inner ring raceways 2a, 4a that are formed on an outer peripheral face of the hub spindle 2 and an outer peripheral face of the inner ring component member 4, respectively.

The rolling elements 6 are held by a cage 20 at predetermined intervals in the circumferential direction. Sealing members 21 are provided in an annular space formed between the outer ring member 5 and the hub wheel 3, and seal the annular space from respective ends of the annular space in the axial direction. In this specification, a direction from the axial center of the hub unit 1 toward each of the outer side and the inner side in the vehicle lateral direction is referred to as "direction toward axial outer side", and a direction from each of positions outward of the hub unit 1 in the vehicle lateral direction toward the axial center of the hub unit 1 is referred to as "direction toward axial inner side".

A flange 7 is formed at an outer end portion (a left end portion in FIG. 1) of the hub wheel 3 in the vehicle lateral direction. The flange 7 has a hole 7a into which a bolt (not shown) is passed, and a wheel of a tire, a brake disc, or the like is attached to the flange 7 with a bolt. On an outer peripheral face of the outer ring member 5, there is formed a fixing flange 8 that is used to attach the hub unit 1 to a vehicle body-side member (not shown) that is supported by a suspension of a vehicle.

The hub spindle 2 is a single-piece member having a large-diameter portion 9 and a small-diameter portion 11 that is smaller in diameter than the large-diameter portion 9 and is contiguous with the large-diameter portion 9 via a step portion. The larger diameter portion 9 is formed on the flange 7 side. The small-diameter portion 11 is smaller in diameter than the large-diameter portion 9 and is contiguous with the large-diameter portion 9 via the step portion. The inner ring raceway 2a corresponding to the outer ring raceway 5a of the outer ring member 5 is formed on an outer peripheral face of the large-diameter portion 9. A through-hole 41 is formed at the center of the hub spindle 2.

The inner ring component member 4 is fitted onto an outer peripheral face of the small-diameter portion 11 of the hub spindle 2. Then, as described later, an end portion of the small-diameter portion 11 is clinched, and a clinched portion 12 is thus formed. In this way, the inner ring component member 4 is fixed between the large-diameter portion 9 and the clinched portion 12.

A driving force from a drive shaft 31 is transmitted to the hub unit 1 through the constant velocity joint 30. The constant velocity joint 30 shown in FIG. 1 is a BARFIELD constant velocity joint. The constant velocity joint 30 includes an inner ring 32, an outer ring 33, a plurality of balls 34, and a cage 35 that holds the balls 34. The inner ring 32 is fixedly connected to one end of the drive shaft 31. The outer ring 33 is arranged radially outward of the inner ring 32. The balls 34 are arranged between the inner ring 32 and the outer ring 33. The cage 35 holds the balls 34.

The outer ring 33 of the constant velocity joint 30 includes an outer ring tubular portion 33a and an outer ring shaft portion 33b. The outer ring tubular portion 33a has a bowl-shape. The outer ring shaft portion 33b projects from a center portion of an outer end face of the outer ring tubular portion 33a in the vehicle lateral direction. The outer ring shaft portion 33b is passed through the through-hole 41 that is formed at the shaft center of the hub spindle 2. An external thread 37 is formed in a distal end portion of the outer ring shaft portion 33b, and a nut 36 is screwed to the external thread 37. By fastening the nut 36 to the external thread 37, the hub spindle 2 and the outer ring 33 are connected to each other.

Figure 2:
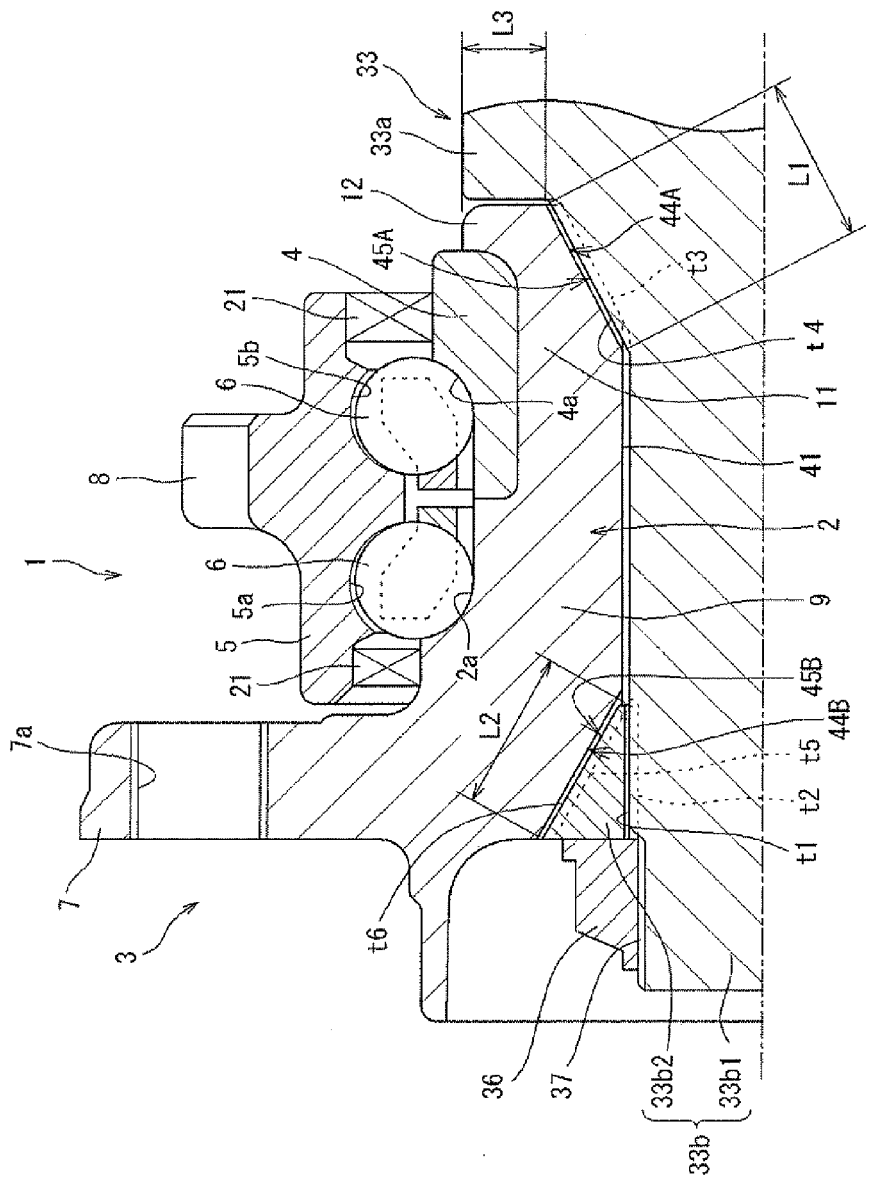
FIG. 2 is an enlarged sectional view illustrating main portions of the wheel support device shown in FIG. 1.

FIG. 2 is an enlarged sectional view illustrating main portions of the wheel support device shown in FIG. 1. At respective axial end portions (end portions on the inner side and the outer side in the vehicle lateral direction) of the inner periphery of the hub spindle 2, which defines the through-hole 41, tapered first connecting portions 44A, 44B are formed. The inner diameters of the first connecting portions 44A, 44B gradually increase toward the axial outer sides. The outer ring shaft portion 33b of the outer ring 33 is formed of a shaft body 33b1 and a connecting member 33b2. The shaft body 33b1 is formed integrally with the outer ring tubular portion 33a, and extends to the outer side from the outer ring tubular portion 33a in the vehicle lateral direction. The aforementioned external thread 37 is formed at the distal end of the shaft body 33b1. In an inner end portion (root portion) of the shaft body 33b1 in the vehicle lateral direction, a second connecting portion 45A is formed. The outer diameter of the second connecting portion 45A gradually increases toward the inner side in the vehicle lateral direction.

The connecting member 33b2 is formed into a tubular shape, and is fitted to the distal end of the shaft body 33b1 so as to be rotatable together with the shaft body 33b1. Specifically, spline teeth t1 and spline teeth t2 that mesh with each other are formed in an outer peripheral portion of the shaft body 33b1 and an inner peripheral portion of the connecting member 33b2, respectively. An outer peripheral portion of the connecting member 33b2 serves as a second connecting portion 45B of which the outer diameter gradually increases toward the outer side in the vehicle lateral direction. Thus, the outer ring shaft portion 33b has the second connecting portion 45A at one axial end portion thereof, and has the second connecting portion 45B at the other axial end portion thereof. Movement of the connecting member 33b2 toward the outer side in the vehicle lateral direction is restricted by the nut 36 that is screwed to the external thread 37 of the shaft body 33b1. Thus, engagement of the connecting member 33b2 with the shaft body 33b1 is maintained.

The first connecting portions 44A, 44B formed in the hub spindle 2, and the second connecting portions 45A, 45B formed in the outer ring shaft portion 33b have spline teeth t3 to t6, respectively. On the inner side in the vehicle lateral direction, the spline teeth t3 of the first connecting portion 44A and the spline teeth t4 of the second connecting portion 45A mesh with each other. On the outer side in the vehicle lateral direction, the spline teeth t5 of the first connecting portion 44B and the spline teeth t6 of the second connecting portion 45B mesh with each other. As a result, the first connecting portions 44A, 44B are spline-connected to the second connecting portions 45A, 45B, respectively. The inner diameters of the first connecting portions 44A, 44B are gradually increased toward the axial outer sides (the inner diameter of the first connecting portion 44A is increased toward the inner side and the inner diameter of the first connecting portion 44B is increased toward the outer side in the vehicle lateral direction). The outer diameters of the second connecting portions 45A, 45B are gradually increased toward the axial outer sides (the outer diameter of the second connecting portion 45A is increased toward the inner side and the outer diameter of the second connecting portion 45B is increased toward the outer side in the vehicle lateral direction). When the second connecting portions 45A, 45B are arranged radially inward of the first connecting portions 44A, 44B, respectively, and the spline teeth t3, t4 are meshed with each other and the spline teeth t5, t6 are meshed with each other, the shaft center of the hub spindle 2 and the shaft center of the outer ring shaft portion 33b are aligned with each other automatically and appropriately. Thus, generation of vibration in a power transmission system caused by an offset between the shaft centers is suppressed.

There is a conventional shaft spline-type hub unit in which the substantially entirety of the inner peripheral face of a hub spindle, which defines a through-hole, is formed into a cylindrical shape, and spline teeth are formed on the inner peripheral face. In addition, in the shaft spline-type hub unit, the substantially entirety of the outer peripheral face of an outer ring shaft portion is formed into a cylindrical shape, and spline teeth are formed on the outer peripheral face of the outer ring shaft portion. Then, the spline teeth of the inner peripheral face, which defines the through-hole, and the spline teeth of the outer ring shaft portion are meshed with each other. The diameters of the connecting portions (the first connecting portions and the second connecting portions) at which the outer ring shaft portion 33b and the hub spindle 2 are connected to each other in the hub unit according to the present embodiment are larger than those in the above-described shaft spline-type hub unit. Therefore, the shaft strength is enhanced.

If a spline connecting portion has a large interference, assembly becomes difficult. This may cause a problem that the inner end face of the hub spindle in the vehicle lateral direction and the outer end face of the outer ring in the vehicle lateral direction are not in close contact with each other and therefore the shaft strength is reduced. On the other hand, if the spline connecting portion has a small interference, a backlash occurs, which may cause abnormal noise (so-called knocking noise) at the start of the vehicle or reduce the shaft strength. For these reasons, in the case of the shaft spline-type hub unit, the spline connecting portions are required to have high dimension accuracy, and the dimension tolerance is strictly set.

In this regard, in the hub unit according to the present embodiment, the hub spindle 2 and the outer ring shaft portion 33b are connected to each other at the first connecting portions 44A, 44B and the second connecting portions 45A, 45B. Therefore, the above-mentioned problem is not likely to occur, and the dimension accuracy need not be as high as that in the shaft spline-type hub unit.

In a conventional side face spline-type hub unit (for example, hub units described in JP 2008-536737 A and JP 2008-538343 A), spline teeth are formed in a small radial range (for example, a range having a length L3 of the clinched portion 12 in FIG. 2) at which an inner end face of a hub spindle in the vehicle lateral direction and an outer end face of an outer ring tubular portion of a constant velocity joint in the vehicle lateral direction face each other. Therefore, in order to achieve a load capacity that reliably ensures power transmission from the constant velocity joint to the hub spindle, it is necessary to form a large number of spline teeth in a clinched portion at a small pitch. Usually, the conventional spline teeth are plastically formed by pushing teeth of a punch (die) against the inner end face of the hub spindle in the vehicle lateral direction. Therefore, in order to form a large number of spline teeth at a small pitch, a large number of teeth need to be formed also in the punch at a small pitch. If a large number of teeth are formed in the punch at a small pitch, the radius of a root portion of each of the teeth becomes small. Thus, when the spline teeth are formed, stress concentration easily occurs at the root portion of each of the teeth of the punch, which may reduce the durability of each of the teeth. This may cause breakage of the punch at an early stage. Such breakage of the punch leads to an increase in the manufacturing costs. The conventional spline teeth may be formed by machining such as cutting, without using a punch. However, workability is reduced as the number of spline teeth is increased and as the pitch becomes smaller.

In this regard, in the hub unit 1 and the constant velocity joint 30 in the present embodiment, the first connecting portions 44A, 44B, and the second connecting portions 45A, 45B are formed on the inner periphery of the hub spindle 2, which defines through-hole 41, and the outer ring shaft portion 33b, respectively. Therefore, lengths L1, L2 of the spline teeth t3 to t6 are longer than the lengths of the spline teeth of the conventional side face spline-type hub unit. As a result, even if the number of spline teeth t3 to t6 is small, a load capacity that reliably ensures power transmission from the outer ring 33 to the hub spindle 2 is reliably achieved. Therefore, a pitch between the spline teeth t3 to t6 in the circumferential direction may be large, and a pitch between teeth of a punch that is used to form the spline teeth t3 to t6 may also be large. Thus, stress concentration caused at the teeth of the punch is reduced, and the durability of the punch is enhanced. This may reduce the manufacturing costs. When the spline teeth t3 to t6 are formed by machining such as cutting, workability may be improved by reducing the number of the teeth.

The lengths L1, L2 of the spline teeth t3 to t6 are made sufficiently larger than the length (shown by L3 in FIG. 2) of the spline teeth formed in the clinched portion 12. For example, it is preferable that the lengths L1, L2 should be two to four times larger than the length L3. By employing such a configuration, the number of the spline teeth may be reduced by 50% to 75% as compared with the conventional spline teeth.

In the conventional side spline face-type hub unit, the outer ring and the hub spindle are connected to each other with a bolt that is screwed to the outer ring. On the other hand, in a commonly-used shaft spline-type hub unit, an outer ring shaft portion formed in an outer ring and a hub spindle are connected to each other with a nut. Therefore, a significant change in configuration is required to shift from the shaft spline-type hub unit to the side face spline-type hub unit. In this regard, in the hub unit 1 according to the present embodiment, the outer ring shaft portion 33b and the hub spindle 2 are connected to each other with the nut 36, as in the shaft spline-type hub unit. Therefore, a significant change in configuration is not required to shift from the shaft spline-type hub unit to the hub unit according to the present embodiment.

The first connecting portion 44A is formed in one axial end portion of the inner periphery of the hub spindle 2, which defines the through-hole 41, and the first connecting portion 44B is formed in the other axial end portion of the inner periphery of the hub spindle 2, which defines the through-hole 41. Also, the second connecting portion 45A is formed in one axial end portion of the outer ring shaft portion 33b, and the second connecting portion 45B is formed in the other axial end portion of the outer ring shaft portion 33b. Thus, power transmission from the outer ring shaft portion 33b to the hub spindle 2 is performed smoothly. Specifically, because power is transmitted from the outer ring shaft portion 33b to the hub spindle 2 at a position close to the flange 7 to which a tire wheel is fitted, excess torsional stress is prevented from being applied to the outer ring shaft portion 33b and the hub spindle 2. Because the connecting member 33b2 is provided at the distal end of the outer ring shaft portion 33b, the outer ring shaft portion 33b is spline-connected to the hub spindle 2 also at the outer end portion in the vehicle lateral direction, via the first and second connecting portions 44B, 45B.

The invention is not limited to the embodiment described above, and various modifications and changes may be made without departing from the scope of the invention set forth in the appended claims.

For example, a connecting member may be provided at the inner end portion of the outer ring shaft portion 33b in the vehicle lateral direction, in addition to the connecting member provided at the outer end portion of the outer ring shaft portion 33b in the vehicle lateral direction, and the second connecting portion 45A may be formed on the connecting member. The first connecting portions 44A, 44B and the second connecting portions 45A, 45B may be formed on arc-shaped surfaces curved into concave/convex shapes. The first connecting portion and the second connecting portion may be formed only in the inner end portions of the inner periphery of the hub spindle 2, which defines the through-hole 41, and the outer ring shaft portion 33b in the vehicle lateral direction, respectively. However, by forming the first connecting portions and the second connecting portions on the inner end portions and the outer end portions of the inner periphery of the hub spindle 2, which defines the through-hole 41, and the outer ring shaft portion 33b, it is possible to transmit higher torque. Regarding the details of the configuration of the wheel support device except the configuration related to connection between the hub spindle 2 and the outer ring 33, the invention is not limited to the above-described embodiment, and other known configurations may be employed.

According to the invention, the shaft center of the hub spindle and the shaft center of the outer ring of the constant velocity joint are easily aligned with each other.

What is claimed is:
1. A wheel support device, comprising:
a hub spindle of a hub wheel to which a vehicle wheel is fitted; and
an outer ring of a constant velocity joint, which is connected to the hub spindle such that power is able to be transmitted between the outer ring and the hub spindle, wherein
a through-hole that passes through the hub spindle in an axial direction of the hub spindle is formed in the hub spindle, an outer ring shaft portion that is passed through the through-hole of the hub spindle is formed on the outer ring; and the outer ring shaft portion is formed of a shaft body and a connecting member, wherein a nut is screwed to an external thread of the shaft body; and an outer ring tubular portion is formed in the outer ring of the constant velocity joint, a first connecting portion of which an inner diameter progressively increases toward the axial outer side is formed on an inner periphery of the hub spindle, which defines the through-hole, a second connecting portion that is arranged radially inward of the first connecting portion and of which an outer diameter progressively increases toward the axial outer side is formed on the outer ring shaft portion so as to correspond to the first connecting portion, and the first connecting portion has spline teeth and the second connecting portion has spline teeth, and the spline teeth of the first connecting portion and the spline teeth of the second connecting portion mesh with each other.

2. The wheel support device according to claim 1, wherein:

the first connecting portion is formed an inner end portion of the inner periphery of the hub spindle, which defines the through-hole, in a vehicle lateral direction; and the second connecting portion is formed on an inner end portion of the outer ring shaft portion in the vehicle lateral direction.

3. The wheel support device according to claim 1, wherein:

the first connecting portion is formed on an outer end portion of the inner periphery of the hub spindle, which defines the through-hole, in the vehicle lateral direction; and the second connecting portion is formed on an outer end portion of the outer ring shaft portion in the vehicle lateral direction.

4. The wheel support device according to claim 3, wherein:

the outer ring shaft portion includes a shaft body that is formed integrally with the outer ring, and a connecting member that is formed separately from the shaft body and that is connected to an outer end portion of the shaft body in the vehicle lateral direction so as to be rotatable together with the shaft body; and the second connecting portion on outer side in the vehicle lateral direction is formed on an outer peripheral portion of the connecting member.

* * * * *